F. B. SLATER.
FILLER ATTACHMENT FOR OIL RESERVOIRS.
APPLICATION FILED NOV. 5, 1921.
1,413,878.
Patented Apr. 25, 1922.
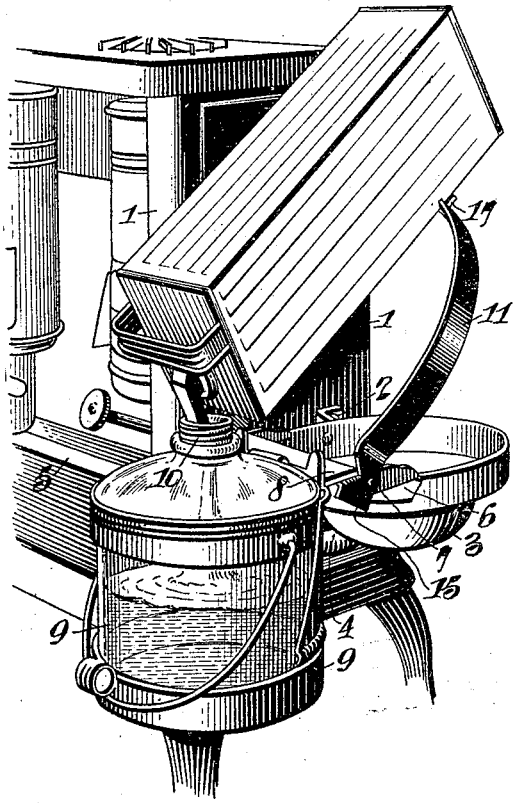
Fig. 1.
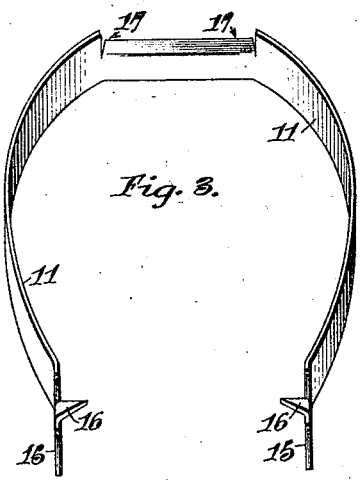
Fig. 3.
Fig. 4.
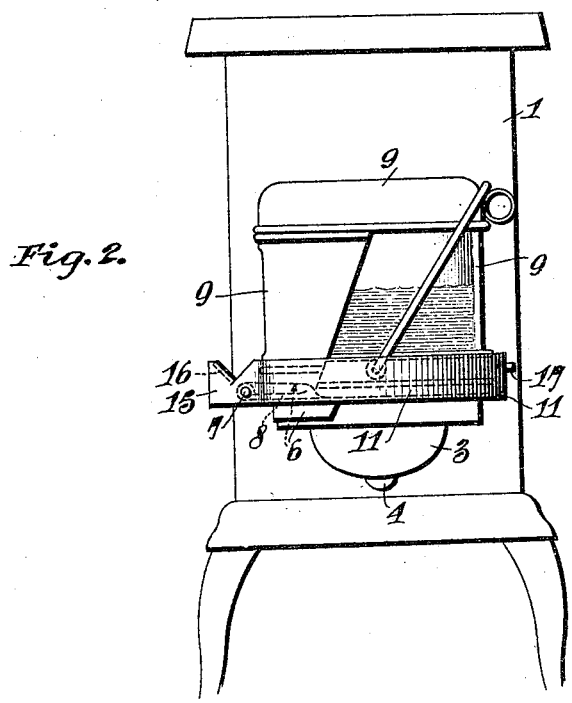
Fig. 2.
INVENTOR
Frank B. Slater.
BY
Frank B. Slater

UNITED STATES PATENT OFFICE.

FRANK B. SLATER, OF WASHINGTON, DISTRICT OF COLUMBIA.

FILLER ATTACHMENT FOR OIL RESERVOIRS.

1,413,878. Specification of Letters Patent. Patented Apr. 25, 1922.

Application filed November 5, 1921. Serial No. 513,108.

*To all whom it may concern:*

Be it known that I, FRANK B. SLATER, a citizen of the United States, residing at Washington, in the District of Columbia, have invented a new and useful Filler Attachment for Oil Reservoirs, of which the following is a specification.

Generally, the invention relates to improvements in that class of liquid fuel cooking and heating stoves wherein is embodied a hinged reservoir for the liquid fuel agent, so constructed as to assume an inverted position when at normal or fuel feeding position, and adapted to be swung on its hinged mounting to an upright position to permit of the replenishing of the exhausted supply of the said fuel agent, such improvement residing in the provision of a suitable new and useful attachment to such fuel reservoir whereby the refilling thereof is accomplished automatically.

As is well known to those familiar with the use of the type of stoves mentioned, considerable inconvenience, loss of time, and often waste of the cooking or baking material is experienced by reason of the inopportune exhaustion of the supply of the liquid fuel agent with its resultant "falling" of baking cakes due to interruption in the baking process, loss of time and energy necessary in the manual refilling of the exhausted reservoir, or possibly burning, and thereby wasting, of cooking or baking product while the attendant is refilling, by hand, the exhausted reservoir and thereby withdrawing the necessary attention to the cooking or baking material.

More particularly the invention seeks to provide a simple, inexpensive and practical filler attachment for oil reservoirs in the nature of a pivoted supporting bracket member so constructed and mounted as to automatically hold thereon the container from which the liquid fuel is transferred when replenishing the exhausted reservoir supply and to hold the same in such position as to insure the proper outflow of said liquid fuel being transferred.

With the above and other objects in view the invention includes those novel details of construction and arrangement of parts all of which are fully stated in the following detailed description, specifically pointed out in the appended claims and illustrated in the accompanying drawing, in which:

Figure 1 is a perspective view illustrating the invention as in use, applied to an oil reservoir.

Figure 2 is a detail side elevation of an oil reservoir with my filler attachment operatively mounted thereon, the parts being in the inoperative position.

Figure 3 is a perspective view of my filler attachment per se.

Figure 4 is a similar view of the blank of strap iron from which the invention is formed, the cuts and borings being clearly indicated, the several lines of bend being also indicated by dotted lines.

In the drawings in which like numerals of reference indicate like parts in all the figures, (1) represents the side wall of any conventional type of liquid fuel cooking stove, (for purposes of illustration and ease of application, that type of cooking stove known to the trade as the "Perfection," is shown in the drawings), which has the usual horizontally, laterally, projecting, support bracket (2) for fixedly and rigidly supporting the stationary or bottom reservoir (3) which is provided with the usual fuel feed outlet (4) through which, and the usual pipe feed line (5), fuel is supplied to the burners. Fixedly attached to the said bottom reservoir (3) is a hinge member (6) which is cooperative, through the removable hinge pintle (7), with another hinge member (8) which is fixedly connected to and thereby swingably supports the main reservoir (9) which, when swung down to the position shown in Figure 1, is adapted to be filled through the filler neck (10) which said filler neck, when the main reservoir is in the operative or fuel feeding position shown in Figure 2, is covered with the usual valved screw cap (not shown).

So far, the parts described are all of the conventional type stated and are briefly described merely to illustrate the application of the invention itself, the description of which follows:

(11) designates a band of strap iron or suitable material which is bent up from the blank shown in Figure 4 to the shape illustrated in Figure 3. It will be seen from the said Figure 4 that the blank is provided midway its length with a pair of cuts (12) and a 45° angle cut (13) near each extreme end of the said blank. The said blank is also provided, at each end and adjacent to each cut (13), with apertures (14) the purpose for which will presently appear. By reference to Figure 4 and to Figure 3, it will be seen that by bending the blank shown in the said Figure 4 on the dotted lines on that figure, an article of manufacture such as is illustrated in the said Figure 3 will be produced, which will include a curved supporting body, shaped to neatly encircle the aforesaid conventional reservoir (9), and having a pair of opposing parallel faces or projections (15) which in turn have projecting therefrom hinge engaging lugs or fingers (16) projecting at right angles from the said faces (15), and a supporting socket or cut-out portion (17) the purpose of all of which will presently appear.

It will be readily apparent, that in the practical application of my filler attachment to the conventional type of reservoir and stove parts hereinbefore described it is not necessary to change, alter, or readjust a single one of such parts. The application of the same being accomplished as follows:

Assuming the reservoir (9) to be resting in the position shown in Figure 2, the person wishing to apply the filler attachment merely withdraws the hinge pintle (7), places the attachment in the position shown in the said Figure 2, that is, with the band (11) encircling the reservoir (9) and resting on the supporting bracket (2) with its parallel opposing faces (15) one at each side of the hinge members (6) and (8) and with the apertures (14) in the said faces being in register with the holes provided in the said hinge members for the now removed hinge pintle. With the parts in this position the hinge pintle (7) is replaced, through the aperture (14) in one projection (15), through the hinge members (6) and (8) and through the other aperture (14) in the projection (15) at the opposite side of the hinge member. The parts are now in operative position to provide an automatically operating fuel container filler support which operates in a manner presently to be explained.

By reference to Figures 1 and 2 it will be seen that the oil reservoir hinge member (8), in its course of travel in the changing of position of the reservoir (9) from the feeding position shown in Figure 2, to the filling position shown in Figure 1, traverses an arc of 180° and it is through the movement of this hinge member that my filler attachment is automatically operated. It will be seen by reference to Figure 2 that the projecting lugs or fingers (16), bent inwardly as shown in the said figure and Figure 3, project into the path of the hinge member (8) in such a manner as to be engaged by the said hinge member after it has traversed approximately 135° of its travel of 180° necessary to bring the parts of the position shown in Figure 1. Therefore, it will be readily seen that when one wishes to fill the reservoir (9) he swings the said reservoir from the position shown in Figure 2 to that shown in Figure 1 the same swinging on its hinge member (8), the said hinge member moving freely the first 135° of its swing and then engaging the inturned lugs or fingers (16) carrying them along with it the last 45° of rotation and thereby raising the circular strap portion (11) to an elevation of approximately 45° as shown in Figure 1.

It is then merely necessary to rest the standard type of liquid fuel container with its feeding nozzle down into the filler neck (10) of the reservoir (9) and support the other end thereof in the notch or seat portion (17) provided therefor, (see Fig. 1) the angle of the supporting band (11) being such as to cause the weight of the liquid fuel container to be distributed forward and downward upon the upright reservoir (9) and thereby overcome all possible tendency of the said container to topple backward and downward with the consequent raising of the empty reservoir (9) and the spilling of the liquid being poured.

After the proper placing of the fuel feed container upon the supporting band (11) as shown in Figure 1 the housewife may then go on about her duties about the kitchen or elsewhere or give the necessary attention to her cooking or baking without worry or waste of time or energy incident to the formerly necessary method of standing and holding the container during the several minutes necessary for the pouring of the liquid from the container to the reservoir (9).

When the parts are in the inoperative position as shown in Figure 2 the band (11) neatly encircles the reservoir (9) as shown and rests on the bracket (2) which projects form the side wall (1) as shown.

From the foregoing description taken in connection with the accompanying drawings, the novel details of construction, advantages and operation of the working part will be readily apparent to those familiar with the use of liquid fuel heating and cooking stoves in which are embodied fuel feed reservoirs.

While I have described and shown a specific means for accomplishing the results desired I wish it to be understood that other and different detailed means may be employed without departing from the scope of the appended claims.

What I claim is:

1. The combination with the hingedly mounted liquid fuel reservoir of a stove; of a liquid fuel container supporting bracket adapted to hold a liquid fuel container in position for pouring the contents thereof into said liquid fuel reservoir.

2. The combination with the hingedly mounted liquid fuel reservoir of a stove; of a liquid fuel container supporting bracket adapted to hold a liquid fuel container in position for pouring the contents thereof into said liquid fuel reservoir, and means on said bracket for holding said liquid fuel container against displacement.

3. The combination with the swingably mounted liquid fuel reservoir of a stove; of a liquid fuel container supporting bracket, means cooperative with the swingably mounted liquid fuel reservoir for elevating the said bracket to a position for receiving the liquid fuel container thereon and in a position for automatically pouring the contents thereof into the said liquid fuel reservoir.

4. The combination with the swingably mounted liquid fuel reservoir of a stove; of a liquid fuel container supporting bracket, means cooperative with the swingably mounted liquid fuel reservoir for elevating the said bracket to a position for receiving the liquid fuel container thereon and in a position for automatically pouring the contents thereof into the said liquid fuel reservoir, and means on the said bracket member for holding said liquid fuel container against displacement while the liquid fuel is pouring therefrom into the said reservoir.

5. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket having means thereon for cooperating with the hinge member of the aforesaid swingably reversable reservoir whereby to cause the said supporting bracket member to rise to an elevation for holding thereon a liquid fuel container in such position as to cause the automatic pouring of the contents of said container into the said reversable reservoir.

6. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket having means thereon for cooperating with the hinge member of the aforesaid swingably reversable reservoir whereby to cause the said supporting bracket member to rise to an elevation for holding thereon a liquid fuel container in such position as to cause the automatic pouring of the contents of said container into the said reversable reservoir, and means on said supporting bracket for holding the said liquid fuel container from lateral displacement while the liquid fuel is being so poured.

7. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket adapted to be pivotally mounted upon the hinge pintle of said swingably reversable reservoir and adapted to encircle the said reservoir and rest upon the horizontal support therefor when the said reservoir is in its normal or liquid fuel feeding position, said bracket being provided with a pair of inturned members adjacent the said pivotal mounting which are adapted to project into the path of the hinge member of the said swingably reversable reservoir whereby to be engaged by the said hinge member while the said reservoir is being swung to its upright or filling position to thereby cause said bracket member to be elevated to a position for supporting thereon a liquid fuel container in a position for effecting the automatic pouring of the liquid therefrom into the said swingable reservoir.

8. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket adapted to be pivotally mounted upon the hinge pintle of said swingably reversable reservoir and adapted to encircle the said reservoir and rest upon the horizontal support therefor when the said reservoir is in its normal or liquid fuel feeding position, said bracket being provided with a pair of inturned members adjacent the said pivotal mounting which are adapted to project into the path of the hinge member of the said hinge member while the said reservoir is being swung to its upright or filling position to thereby cause said bracket member to be elevated to a position for supporting thereon a liquid fuel container in a position for effecting the automatic pouring of the liquid therefrom into the said swingable reservoir, and means on said bracket member for holding the said liquid fuel container against lateral displacement while the liquid is being poured.

9. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket adapted to be pivotally mounted upon the hinge pintle of said swingably reversable reservoir and adapted to encircle the said reservoir and rest upon the horizontal support therefor when the said reservoir is in its normal or liquid fuel feeding position, said bracket being provided with a pair of inturned members adjacent the said pivotal mounting which are adapted to project into the path of the hinge member of the said swingably reversable reservoir whereby to be engaged by the said hinge member while the said reservoir is being swung to its upright or filling position to thereby cause said bracket member to be elevated to a position for supporting thereon a liquid fuel container in a position for effecting the automatic pouring of the liquid therefrom into the said swingable reservoir, said bracket also having provision for causing the weight of the said liquid fuel container and contents to be distributed forwardly and downwardly upon the reservoir being filled to thereby overcome the balance of weight and insure against the liquid fuel container forcing down the supporting bracket and bringing the reservoir up therewith.

10. The combination with the liquid fuel reservoir of a stove which comprises a lower stationary reservoir member and an upper swingably reversable main reservoir having a hinge member adapted to cooperate with a hinge member on said lower reservoir so that the said main reservoir may be swung down to an inverted position for filling; of a liquid fuel container supporting bracket adapted to be pivotally mounted upon the hinge pintle of said swingably reversable reservoir and adapted to encircle the said reservoir and rest upon the horizontal support therefor when the said reservoir is in its normal or liquid fuel feeding position, said bracket being provided with a pair of inturned members adjacent the said pivotal mounting which are adapted to project into the path of the hinge member of the said swingably reversable reservoir whereby to be engaged by the said hinge member while the said reservoir is being swung to its upright or filling position to thereby cause said bracket member to be elevated to a position for supporting thereon a liquid fuel container in a position for effecting the automatic pouring of the liquid therefrom into the said swingable reservoir, said bracket also having provision for causing the weight of the said liquid fuel container and contents to be distributed forwardly and downwardly upon the reservoir being filled to thereby overcome the balance of weight and insure against the liquid fuel container forcing down the supporting bracket and bringing the reservoir up therewith, and means on said bracket member for holding said liquid fuel container against lateral displacement while the liquid is being poured.

11. As an article of manufacture of the class described, a substantially U shaped band member designed to neatly encircle the hinged reservoir of a liquid fuel stove, including a pair of parallel faces projected therefrom and provided with suitable apertures whereby to provide, at each side of the hinge member of the said reservoir, a pivotal connection for each said parallel projection; each said parallel projection being also provided with an inturned lug designed to project into the path of travel of the hinge member of the said reservoir for the purpose of being engaged thereby to raise the said band member to an elevation for supporting thereon a liquid fuel container in position to cause the ready flow of the contents therefrom into the reservoir to be filled; and a seat portion provided upon said band member for holding said container from lateral displacement during the pouring of the liquid.

12. As an article of manufacture of the class described, a substantially U shaped band member designed to neatly encircle the hinged reservoir of a liquid fuel stove, including a pair of parallel faces projected therefrom and provided with suitable apertures whereby to provide, at each side of the hinge member of the said reservoir, a pivotal connection for each said parallel projection; each said parallel projection being also provided with an inturned lug designed to project into the path of travel of the hinge member of the said reservoir, said lugs being bent inwardly at an angle of approximately 45° from the lower periphery of the said apertures whereby to cause the said inturned lugs to be engaged flatly by the reservoir hinge member while in its course of travel and after the said hinge member has traversed 135° of its 180° of travel so that the lugs are carried with the said hinge member the last 45° of its travel thereby causing the said supporting band member to rise to an elevation for supporting thereon a liquid fuel container in position to cause the ready flow of the contents therefrom into the reservoir to be filled.

13. As an article of manufacture of the class described, a substantially U shaped band member designed to neatly encircle the hinged reservoir of a liquid fuel stove, including a pair of parallel faces projected therefrom and provided with suitable apertures whereby to provide, at each side of the hinge member of the said reservoir, a pivotal connection for each said parallel projection; each said parallel projection being also provided with an inturned lug designed to project into the path of travel of the hinge member of the said reservoir, said lugs being bent inwardly at an angle of approximately 45° from the lower periphery of the said apertures whereby to cause the said inturned lugs to be engaged flatly by the reservoir hinge member while in its course of travel and after the said hinge member has traversed 135° of its 180° of travel so that the lugs are carried with the said hinge member the last 45° of its travel thereby causing the said supporting band member to rise to an elevation for supporting thereon a liquid fuel container in position to cause the ready flow of the contents therefrom into the reservoir to be filled, and a seat portion provided upon said band member for holding said container from displacement during the pouring of the liquid.

14. As an article of manufacture of the class described, a substantially U shaped band member designed to neatly encircle the hinged reservoir of a liquid fuel stove, including a pair of parallel faces projected therefrom and provided with suitable apertures whereby to provide, at each side of the hinge member of the said reservoir, a pivotal connection for each said parallel projection; each said parallel projection being also provided with an inturned lug designed to project into the path of travel of the hinge member of the said reservoir, said lugs being bent inwardly at an angle of approximately 45° from the lower periphery of the said apertures whereby to cause the said inturned lugs to be engaged flatly by the reservoir hinge member while in its course of travel and after the said hinge member has traversed 135° of its 180° of travel so that the lugs are carried with the said hinge member the last 45° of its travel thereby causing the said supporting band member to rise to an elevation for supporting thereon a liquid fuel container in position to cause the ready flow of the contents therefrom into the reservoir to be filled, and a seat portion provided upon said band member for holding said container from displacement during the pouring of the liquid, and whereby the weight of the said container is distributed forwardly and downwardly to overcome any tendency of the reservoir member rising while being filled.

15. As an article of manufacture adapted to be shaped up from a metal blank in the nature of a relatively long flat strap provided, midway its length, with a pair of suitably spaced cuts or slits extending half way across said blank, and at each end thereof with an angled slit or cut and an aperture, said slit or cut extending from the inner long edge of said blank towards the outer long edge thereof at an angle directed toward the end of the said blank; said blank strap member being adapted to be bent into a substantially U shaped band member with the central portion thereof, between the said central cuts bent backwardly and downwardly to form an edge limited seat portion, and the two extreme ends of said strap being bent to form projecting parallel faces having centered thereon the angled slit and the said angled ear formed between the said slit and the blank end being adapted to be bent inwardly toward the opposing parallel face at right angles to form a lug member the angle of which is directed toward the periphery of the aperture in said parallel face for the purposes described.

16. As a new article of manufacture, an attachment for tiltable liquid fuel reservoir of the class described; said attachment comprising a substantially U shaped body having parallel ends provided with pivot holes and with inturned projections said body having a recessed portion at the bend for the purposes described.

FRANK B. SLATER.